United States Patent [19]

Iwata et al.

[11] Patent Number: 4,503,296
[45] Date of Patent: Mar. 5, 1985

[54] SELF-CANCELLING MECHANISM FOR CANCELLING A TURN-SIGNAL SWITCH OF A VEHICLE

[75] Inventors: Masayosi Iwata; Yoshikazu Hayashi, both of Gifu; Tadashi Yokoyama, Mie, all of Japan

[73] Assignee: Kabushiki Kaisha Tokai-Rika-Denki-Seisakusho, Aichi, Japan

[21] Appl. No.: 495,447

[22] Filed: May 17, 1983

[30] Foreign Application Priority Data

May 20, 1982 [JP] Japan .................................. 57-73720

[51] Int. Cl.³ .............................................. H01H 3/16
[52] U.S. Cl. ............................... 200/61.27; 200/61.34; 200/61.54; 200/288
[58] Field of Search ............... 200/61.27, 61.28, 61.29, 200/61.3, 61.31, 61.32, 61.33, 61.34, 61.35, 61.36, 61.37, 61.38, 61.54, 61.55, 61.56, 61.57, 288

[56] References Cited

U.S. PATENT DOCUMENTS 2,654,206 10/1953 Dowbrowski ............... 200/61.54 X
3,363,071 1/1968 Barcus ............................ 200/61.34

Primary Examiner—A. D. Pellinen
Assistant Examiner—Morris Ginsburg
Attorney, Agent, or Firm—Koda and Androlia

[57] ABSTRACT

A self-cancelling mechanism is mounted on a steering column of a vehicle, is used for a turn-signal device signalling a change of a running direction of the vehicle and switches off turn-signal lamps by a returning rotation of a steering wheel. A ratchet is pivotally supported to a bracket pivoted to the steering column and is operated by a driver, and a cancelling cam body is arranged between the ratchet and the steering shaft. The ratchet is rotatable from its neutral position against the bracket up to a pair of rotation positions and is forced to the neutral position by an elastic member so that, even if the ratchet is suddenly returned back to the neutral position by the rotation of the steeling shaft in an anticancelling direction, striking noise does not occur.

20 Claims, 7 Drawing Figures

SELF-CANCELLING MECHANISM FOR CANCELLING A TURN-SIGNAL SWITCH OF A VEHICLE

BACKGROUND OF THE INVENTION

1. Field of the Invention

The present invention relates to a self-cancelling mechanism for cancelling a turn-signal switch of a vehicle put in an actuated condition in response to a steering operation of the vehicle.

2. Description of the Prior Art

A turn-signal switch mounted on a steering column of a vehicle functions to actuate turn-signal lamps, for example right side turn-signal lamps, to signal a change of a running direction of the vehicle to succeeding vehicles and the like by a driver's operation of a turn-signal lever prior to the rotation of a steering wheel of the vehicle.

After this, the driver rotates the steering wheel to the right side to change the running direction of the vehicle. When the change of the running direction is completed, the steering wheel is returned back to its neutral position and by this return action, namely the rotation of the steering wheel in a cancelling direction, a self-cancelling mechanism acts to return the turn-signal switch back to a neutral position so that the turn-signal lamps are switched off.

In such a self-cancelling mechanism, in general, a ratchet is mounted on a bracket rotated by the turn-signal lever and is relatively movable to the bracket in a predetermined distance, and the ratchet is moved into a rotation locus of a cancelling cam which is rotated together with a steering shaft of the vehicle at the time of the rotation of the turn-signal lever so that the turn-signal lever is returned back to the neutral position by the rotation of the steering shaft in a cancelling direction.

In addition, when the steering wheel is rotated in the direction reverse to the cancelling direction with actuated, or blinking, turn-signal lamps the ratchet is relatively moved to the bracket so that the bracket is maintained in its rotation position and the turn-signal lamps are kept in their blinking condition. This relative movement is cancelled when the cancelling cam is separated from the ratchet, and the ratchet is returned back to its original position by a returning force of a return spring. By this returning force the ratchet is caused to strike against the bracket and striking noises occur continuously due to the rotation of the steering wheel in an anti-cancelling direction.

For this reason, for example, U.S. Pat. NO. 4,335,284 has proposed a turn-signal switch in which shock absorbing members are provided between a ratchet and a bracket.

In this switch, however, the shock absorbing members absorb kinetic energy of the ratchet but the ratchet still strikes against the bracket in the same manner as the conventional arts whereby the striking noises occur.

SUMMARY OF THE INVENTION

In a self-cancelling mechanism according to the present invention, a ratchet opposed to a cancelling cam body which is rotated together with a steering shaft is pivotally supported to a bracket, being rotatable from its neutral position to a pair of rotation positions, and is forced to the neutral position by an elastic member.

Accordingly, even when the ratchet is returned from one of the rotation positions back to the neutral position in response to the rotation of the steering shaft, the ratchet does not strike against the bracket so that striking noises do not occur.

Description will hereinunder be given of embodiments of the present invention with reference to the drawings.

BRIEF DESCRIPTION OF THE DRAWINGS

FIG. 1 is a plan view;

FIG. 2 is a cross sectional view; and

FIG. 3 is a disassembled perspective view of an enlarged main portion:

DESCRIPTION OF THE PREFERRED EMBODIMENT

Figure 1:
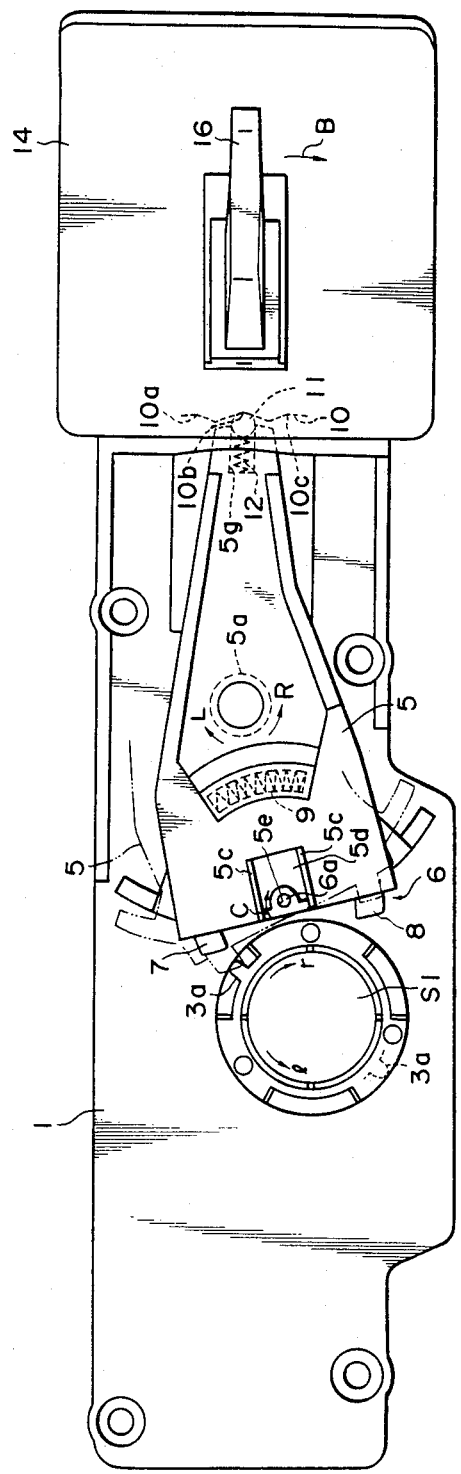
FIGS. 1 through 3 show one embodiment according to the present invention.
Figure 2:
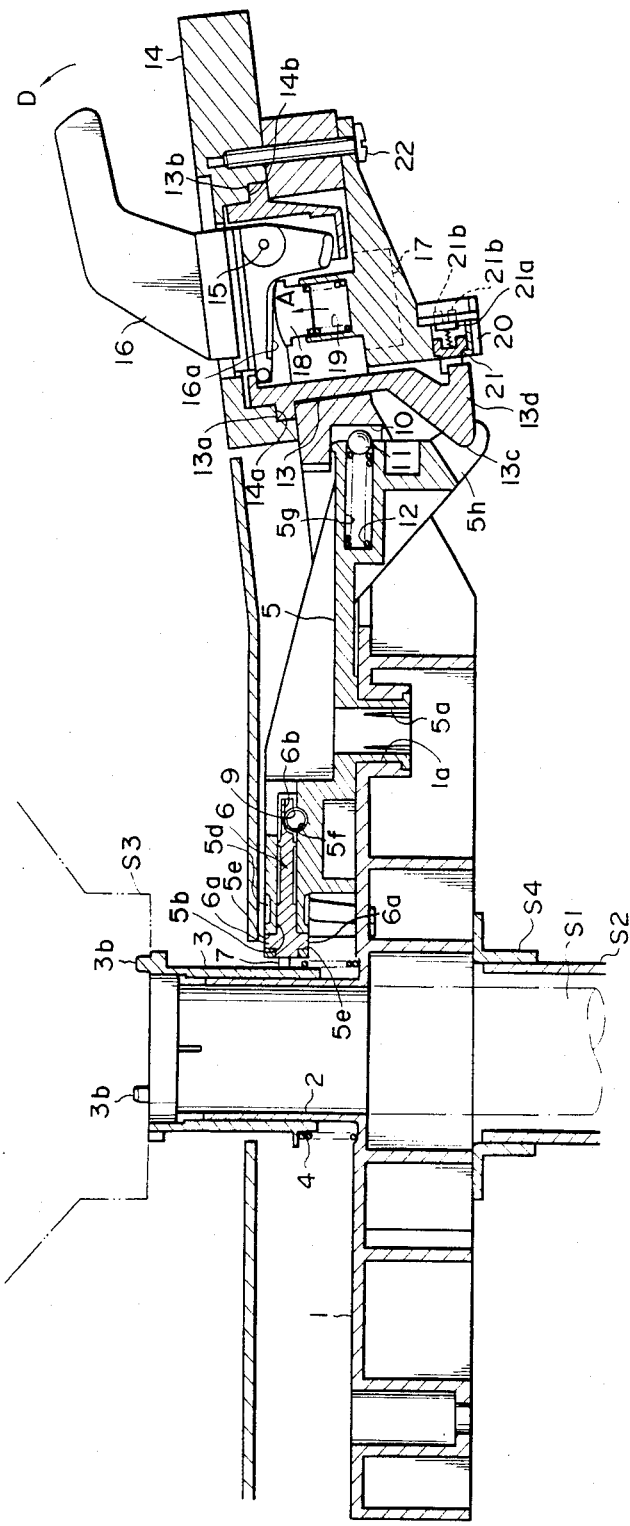

In the first embodiment of the present invention, as shown in FIGS. 1 and 2, a steering column is provided in its axial center portion with a steering shaft S1 passing through a column tube S2 and the forward end of the steering shaft S1 is securely provided with a steering wheel S3 for operation of a driver.

Fixed to the column tube S2 is a switch-mounting base plate 1 through steel plate S4 by screws or the like. The forward end of the cylindrical portion 2 of the base plate 1 is provided with a cancelling cam body 3, which is rotatable about the cylindrical portion 2. Projected from the peripheral portion of the cancelling cam body 3 towards the radius direction of the cam body 3 are a pair of projections 3a and projected from the cancelling cam body 3 towards the axis direction thereof are three projections 3b. The projections 3b are caused to engage with engaging holes, not shown, of the steering wheel S3 by the spring force of a compression coil spring 4 so that the cancelling cam body 3 is rotated together with the steering wheel S3.

Figure 3:
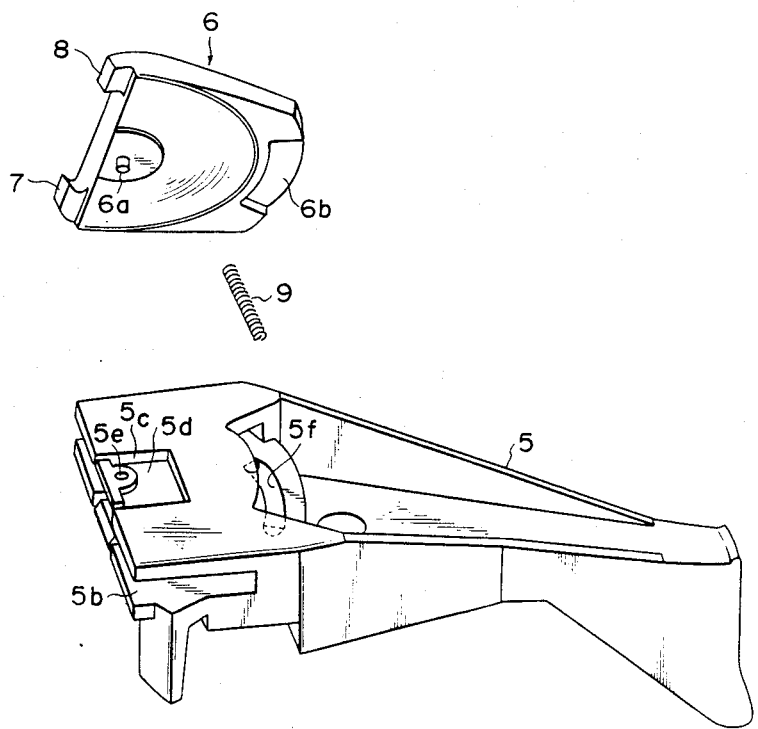

The base plate 1 is formed with a through-hole 1a to which a bracket 5 is rotatably supported at its cylindrical portion 5a parallel to the steering shaft S1, and the bracket 5 is provided at its end portion on the cancelling cam body 3 side with a supporting recess 5b opened in the direction of the cancelling cam body 3 and being parallel substantially to the base plate 1 (refer to FIG. 3). The bracket 5 is formed with a pair of slit grooves 5c parallel to one another and between the slit grooves 5c, 5c single-supported beams 5d are formed. The single-supported beams 5d are flexible and are penetratingly formed close to their forward end with shaft holes 5e. The ratchet 6 is formed with co-axial shaft portions 6a, 6a which extend a space formed between a pair of the single-supported beams 5d, utilizing the elastic force of the beams 5d themselves, so that the shaft portions 6a, 6a are inserted into the shaft holes 5e, 5e. The ratchet 6 is projectingly formed at its cancelling cam body 3 side with a pair of rectangular nail portions 7, 8 in a form of surrounding the shaft portions 6a. The nail portions 7, 8 are arranged close to the cam projections 3a of the cancelling cam body 3 for returning the bracket 5. In addition, the ratchet 6 is formed at its lower face with an arc recess 6b and the bracket 5 is formed with an arc recess, or groove, 5f having a sectional view of a semicircle and opposed to the arc recess, or groove, 6b. Received in both of the arc recesses 6b and 5f is a compression coil spring 9, as being an elastic member, in a form of covering the recesses 6b and 5f. That is, the compression coil spring 9 is received on halves in the boundary of its axial center in the respective recesses 6b and 5f. The ratchet 6 is always kept in a neutral position, shown in FIG. 1, about the shaft portions 6a against the bracket 5 by the compression coil spring 9.

Opposed to the tip end of the bracket 5 is a detent wall 10 which is formed integrally on the base plate 1 and is provided with three recesses 10a through 10c in series. In addition, the bracket 5 is formed at its tip end with a blind hole 5g in which a ball 11 which engages with the recess 10a to 10c and a coil spring 12 which forces the ball 11 in the direction of the recesses 10a to 10c are provided. The condition that the ball 11 is forced into the central recess 10b is a neutral condition of the bracket 5 and a stopper, not shown, is provided so as to restrict the rotation of the bracket 5 within the range where the ball 11 is inserted into the recesses 10a to 10c.

The bracket 5 is formed at its forward end with a connecting recess 5h. Arranged on the base plate 1 close to the detent wall 10 is a knob holder 13 provided with shaft portions 13a, 13b and arranged on the upper face of the end portion of the base plate 1 is a trim panel 14 provided with recesses 14a, 14b, the knob holder 13 being rotatably supported to the recesses 14a and 14b through the shaft portions 13a and 13b. Rotatably supported to the knob holder 13 is a knob 16 through a pin 15. The forward end of the knob 16 is elongated from the trim panel 14 for operation of the driver. The knob holder 13 is formed at its lower end portion with a connecting projection 13c which is engaged with and connected to the connecting recess 5h.

Fixed to the base plate 1 is a dimmer and passing switch 17, an operating button 18 of which is caused to abut on an operation portion 16a of the knob 16 by a return spring 19, and the knob 16 is always forced in the direction of an arrow mark A by the return spring 19. Furthermore, the dimmer and passing switch 17 is switched by the repeatedly pushing operation of the operation button 18. On the other hand, fixed to the base plate 1 is a turn-signal switch 20, and connected to a connecting portion 13d of the lower end of the knob holder 13 is a contact holder 21 which receives a driving force from the knob holder 13. Supported on the contact holder 21 is a movable contact 21a, which is moved in a direction of a right angle to FIG. 2 to be caused to contact with a plurality of fixed contacts 21b selectively whereby turn-signal lamps on the right side or the left side of the vehicle are actuated.

The dimmer and passing switch 17, the base plate 1 and the trim panel 14 are fixed integrally by a screw 22.

Description will now be given of operation of the present embodiment.

As shown in FIGS. 1 and 2, when the knob 16 is placed in the neutral position, the turn-signal switch 20 is also put in the neutral position. At this time the nail portions 7, 8 of the ratchet 6 is positioned out of the rotation locus of the cam projections 3a of the cancelling cam body 3 and the ball 11 is engaged with the cam recess 10b.

Next, when the knob 16 is operated in the direction of an arrow mark B on FIG. 1, about the shaft portions 13a and 13b of the knob holder 13, then the knob holder 13 is also rotated in the same direction as the knob 16 and the contact holder 21 is slided so that the turn-signal switch 20 is put in a switched situation of "R" shown in FIG. 1 and the turn-signal lamps on the right side of the vehicle are blinked. In addition, when the bracket 5 is rotated in the direction of an arrow mark R, about the shaft portion 5a together with the rotation of the knob holder 13, the nail portion 7 of the ratchet 6 is moved within the rotation locus of the cam projections 3a of the cancelling cam body 3 so that the ball 11 is caused to engage with the cam recess 10a and the bracket 5 is maintained in its rotated position.

At this condition the steering wheel S3 is rotated in the direction of an arrow mark r, i.e. an anti-cancelling direction, whereby the vehicle is turned to the right. By the rotation of the steering wheel S3 the cam projection 3a is caused to abut on the nail portion 7 of the ratchet 6 so as to give a rotation force in the arrow mark R direction to the bracket 5 through the ratchet 6. However, since an additional rotation of the bracket 5 in the arrow mark R direction is prevented by the stopper, not shown, provided on the base plate 1, the ratchet 6 is rotated against the compression coil spring 9 in the direction of an arrow mark C on FIG. 1, about the shaft portion 6a so that the nail portion 7 moves over the cam projection 3a. Accordingly, the bracket 5 is kept in the position rotated in the arrow mark R direction. When the nail portion 7 is separated from the cam projection 3a, the ratchet 6 is rotatably returned in the direction reverse to the arrow mark C direction by the spring force of the compression coil spring 9, and the ratchet 6 is stopped moving when the ratchet 6 is moved to its neutral position against the bracket 5. The ratchet 6 moved to the neutral position is stopped in the neutral position only by the resistance force of the compression coil spring 9 and, therefore, the ratchet 6 does not strike with the bracket 5 so as not to cause loud striking noises. Moreover, even if the ratchet 6 is rotated unnecessarily in the direction reverse to the arrow mark C to exceed the neutral position, the rotation of the ratchet 6 is restricted due to the rotation force in the arrow mark C direction by the compression coil spring 9 and thereby the ratchet 6 is rotated from its over-rotated position back to the neutral position. Next, when the steering wheel S3 is rotated in the direction of an arrow mark l, i.e. the cancelling direction, the cam projection 3a of the cancelling cam body 3 is caused to abut on the nail portion 7 of the ratchet 6. At this time the spring force of the compression coil spring 9 is greater than the force by which the ball 11 is kept in the recess 10a and, therefore, the rotation force of the cancelling cam body 3 is transmitted to the bracket 5 through ratchet 6 whereby the bracket 5 is rotated in the direction of an arrow mark L to be returned back to the neutral position shown on FIGS. 1 and 2. The knob holder 13 and the contact holder 21 are also returned back to the neutral positions in response to the rotation of the bracket 5. Thus, the self-cancelling mechanism is worked.

On the other hand, when the knob 16 is operated from its neutral position in the direction reverse to an arrow mark B, centering the shaft portions 13a, 13b of the knob holder 13, the knob holder 13 is rotated in the same direction as the knob 16 and the contact holder 21 is slided so that the turn-signal switch 20 is put in a switched situation of "L" shown on FIG. 1 and the turn-signal lamps on the left side of the vehicle are blinked. In response to the rotation of the knob holder 13 the bracket 5 is rotated in the direction of an arrow mark L so that the nail portion 8 of the ratchet 6 is moved within the rotation locus of the cam projection 3a of the cancelling cam body 3 and the ball 11 is caused to engage with the recess 10c. When the steering wheel S3 is rotated in the direction of the arrow mark l, the ratchet 6 is rotated in the direction reverse to the arrow mark C so that the nail portion 8 moves over the cam projection 3a. Accordingly, when the steering wheel S3 is rotated in the direction of the arrow mark r, the self-cancelling mechanism is worked in the same manner as set forth above.

In addition, when the knob 16 is rotated from its neutral position shown on FIG. 2 in the direction of an arrow mark D about the pin 15, the operation button 18 of the dimmer and passing switch 17 is pushed-in by the operation portion 16a whereby the dimmer and passing action is carried out, and when the knob 16 is released the knob 16 is automatically returned back to its original position together with the operation button 18 owing to the spring force of the return spring 19.

As set forth above, according to the above embodiment, when the steering wheel S3 is rotated in the anti-cancelling direction with the bracket 5 rotated right or left to move the nail portion 7 or 8 of the ratchet 6 over the cam projection 3a so as to return the ratchet 6 back to the original neutral position, the ratchet 6 is stopped in the neutral position while being braked by the spring force of the compression coil spring 9. Accordingly, the ratchet 6 does not strike against the bracket 5 and, therefore, any striking noise does not occur, which is different from the conventional devices.

FIGS. 4 to 7 show the second to fifth embodiments according to the present invention which are described below only regarding the portions different from the first embodiment described above.

Figure 4:
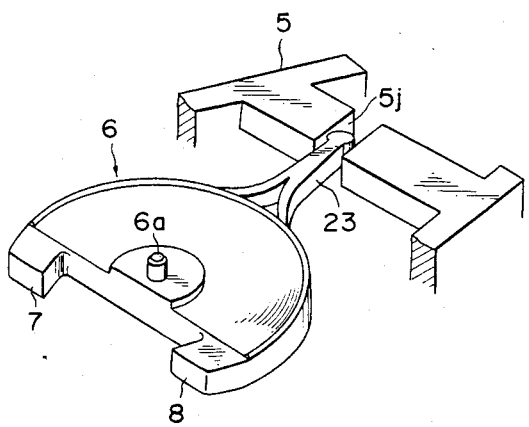
FIG. 4 is a perspective view of an enlarged main portion of a second embodiment.

In FIG. 4 the ratchet 6 is made of a synthetic resin and is integrally formed projectively with elastic arm portion 23, as being a spring member, instead of the compression coil spring 9. The elastic arm portion 23 is inserted into a recess 5j formed on the bracket 5 and is caused to function in the same manner as the compression coil spring 9 mentioned above.

In the second embodiment, therefore, when the ratchet 6 is suddenly released after rotated right or left, the elastic arm member 23 can return the ratchet 6 back to the neutral position without causing the ratchet 6 to abut on the bracket 5.

Figure 5:
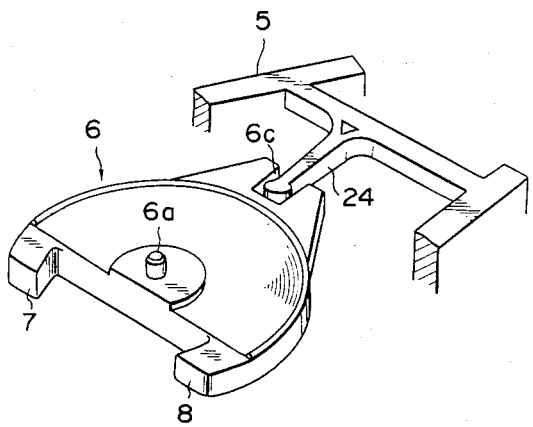
FIG. 5 is a perspective view of an enlarged main portion of a third embodiment.

Next, in the third embodiment shown in FIG. 5 the bracket 5 is integrally formed projectively with an elastic arm portion 24, as being a spring member, instead of the compression coil spring 9. The elastic arm portion 24 is inserted into a recess 6c formed on the ratchet 6 and is caused to function in the same manner as the compression coil spring 9 stated above.

Figure 6:
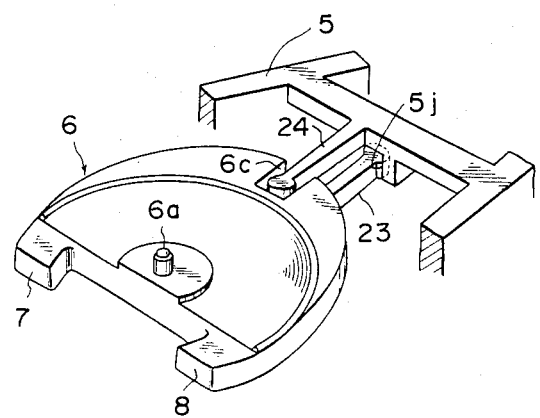
FIG. 6 is a perspective view of an enlarged main portion of a fourth embodiment.

The fourth embodiment shown in FIG. 6 is intended for a combination of the second and third embodiments above-stated in which the elastic arm portion 24 projected from the bracket 5 is inserted into the recess 6c of the ratchet 6 and the elastic arm portion 23 projected from the ratchet 6 is inserted into the recess 5j of the bracket 5. As a result, the load acting on the elastic arm portions 23, 24 is dispersed so that the durations of the elastic arm portions 23, 24 can be improved.

Figure 7:
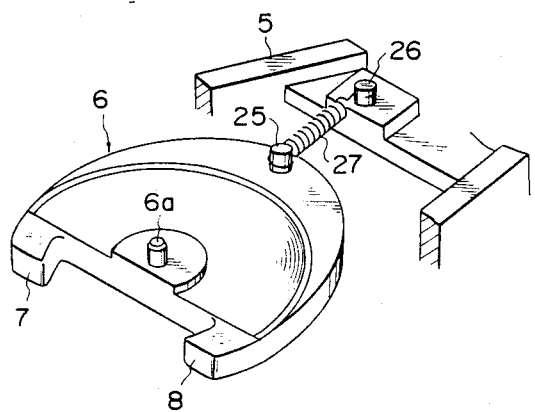
FIG. 7 is a perspective view of an enlarged main portion of a fifth embodiment.

In the fifth embodiment shown in FIG. 7 the ratchet 6 and the bracket 5 are provided projectively with the respective pins 25 and 26 which are bridged by a tension coil spring 27 in which the tension coil spring 27 is caused to function in the same manner as the compression coil spring 9.

As set forth above, the second through fifth embodiments shown in FIGS. 4 through 7 have the substantially same functions and effects as the first embodiment shown in FIGS. 1 through 3.

What is claimed is:

1. A self-cancelling mechanism for cancelling blinking of turn-signal lamps of a vehicle, mounted on a steering column receiving therein a steering shaft fixed at its forward end portion with a steering wheel and used for a turn-signal device signalling a change of a running direction of the vehicle comprising:
   (a) a bracket rotated by an operation of a driver;
   (b) a detent means keeping the bracket in its original position or in one of a pair of operation positions in response to the operation of the driver;
   (c) a turn-signal switch respectively switched on or off in accordance with movement to the pair of operation positions of the bracket;
   (d) a ratchet pivotally supported to the bracket and rotatable from a neutral position against the bracket to a pair of rotation positions situated on both sides of the neutral position;
   (e) a cancelling means moving the ratchet from the neutral position against the bracket to the rotation position, when the bracket is situated in the operation position and the steering wheel is rotated in anti-cancelling direction, and returning the bracket back to the original position together with the ratchet, when the steering wheel is rotated in a cancelling direction; and
   (f) an elastic member provided between the bracket and the ratchet and returning the ratchet from one of the pair of the rotation positions to the neutral position by its elastic force to keep the ratchet in the neutral position, whereby the ratchet is returned back to the neutral position without causing the ratchet to abut on the bracket so as not to cause striking noise.

2. A self-cancelling mechanism for cancelling blinking of turn-signal lamps of a vehicle as set forth in claim 1, wherein the bracket is mounted on a base plate fixed to the steering column and is rotatable about an axis parallel to a steering shaft.

3. A self-cancelling mechanism for cancelling blinking of turn-signal lamps of a vehicle as set forth in claim 2, wherein the detent means comprises a plurality of recesses formed on the base plate and a ball supported in the bracket and forced selectively into one of the plurality of the recesses by a spring force so as to position the bracket.

4. A self-cancelling mechanism for cancelling blinking of turn-signal lamps of a vehicle as set forth in claim 1, wherein the elastic member is a compression coil spring, which is received on halves in the boundary of its axial center into both arc grooves respectively formed on the bracket and the ratchet to be opposed to each other, and one end of the compression coil spring in its axial direction gives a pushing force to the ratchet, so as to give a returning force to the ratchet.

5. A self-cancelling mechanism for cancelling blinking of turn-signal lamps on a vehicle as set forth in claim 4, wherein the axial center of the compression coil spring is arranged in an arc form centering a portion of the ratchet pivoted to the bracket.

6. A self-cancelling mechanism for cancelling blinking of turn-signal lamps of a vehicle as set forth in claim 2, wherein a portion of the ratchet pivoted to the bracket is arranged between a portion of the bracket mounted to the base plate and the steering shaft.

7. A self-cancelling mechanism for cancelling blinking of turn-signal lamps of a vehicle as set forth in claim 2, wherein an operation of an operation knob for driver's operation supported on the base plate is transmitted to the bracket as a rotation force.

8. A self-cancelling mechanism for cancelling blinking of turn-signal lamps of a vehicle as set forth in claim 2, wherein a knob holder is pivotally supported to the base plate, an operation knob having its axial center in a right angle to the axial center of the knob holder is pivotally supported to the knob holder and a part of the knob holder is connected to the bracket so as to transmit the operation force of the operation knob to the bracket.

9. A self-cancelling mechanism for cancelling blinking of turn-signal lamps of a vehicle as set forth in claim 8, wherein, when the operation knob is rotated relative to the knob holder, a dimmer and passing switch mounted on the base plate is worked.

10. A self-cancelling mechanism for cancelling blinking of turn-signal lamps of a vehicle as set forth in claim 1, wherein the elastic member is made of a pole member projected integrally from the ratchet, the forward end thereof being received in a recess formed on the bracket, the pole member is subjected to an elastic deformation by movement of the ratchet towards the rotation position and the ratchet is forced to the neutral position by the force of the pole member reverting from the elastically deformed shape to its original shape.

11. A self-cancelling mechanism for cancelling blinking of turn-signal lamps of a vehicle as set forth in claim 10, further comprising a second elastic pole member projected integrally from the bracket, a forward end thereof being inserted into a groove of the ratchet and a stress acting upon the pole members at the time of the rotation of the ratchet being reduced.

12. A self-cancelling mechanism for cancelling blinking of turn-signal lamps of a vehicle as set forth in claim 1, wherein the elastic member is a tension coil spring bridging the ratchet and the bracket, the tension coil spring is pulled by the rotation of the ratchet to the rotation position and the ratchet is subjected to a rotation force up to the shortest position of the axis length of the tension coil spring.

13. A self-cancelling mechanism for cancelling a turn-signal device of a vehicle for signalling a change of a running direction of the vehicle by rotation of the steering wheel, arranged close to a steering column of the vehicle, comprising:
(a) a base plate fixed to a steering column tube;
(b) a cancelling cam body mounted on the base plate and rotated together with the steering wheel;
(c) a bracket pivotally supported to the base plate and rotated from its original position selectively to one of a pair of operation positions to be maintained in the one of the operation positions;
(d) a ratchet pivotally supported to the bracket and rotatable about an axis parallel to the axial center of the bracket from its neutral position selectively to one of a pair of rotation positions arranged on both the sides of the neutral position, a pair of nail portions on the ratchet being opposed to the cancelling cam body, so that the bracket is returned back to the original position by the rotation of the steering wheel in a cancelling direction and the bracket is maintained in the operation position to move the ratchet relative to the bracket at the time of the rotation of the steering wheel in an anti-cancelling direction; and
(e) an elastic member forcing the ratchet from the rotation positions to the neutral position and, in case that the ratchet is suddenly moved from one of the rotation positions to the neutral position, giving to the ratchet a resistance force against movement to the other of the rotation positions due to an inertial force of the ratchet.

14. A self-cancelling mechanism for cancelling a turn-signal device of a vehicle for signalling a change of running direction of the vehicle by rotation of a steering wheel as set forth in claim 13, wherein the elastic member is a compression coil spring, which is received on halves in the boundary of its axial center into both arc grooves respectively formed on the bracket and the ratchet to be opposed to each other, and one end of the compression coil spring in its axial direction gives a pushing force to the ratchet, the other end thereof giving a pushing force to the bracket, so as to give a returning force to the bracket.

15. A self-cancelling mechanism for cancelling a turn-signal device of a vehicle for signalling a change of a running direction of the vehicle by rotation of a steering wheel as set forth in claim 14, wherein the axial center of the compression coil spring is arranged in an arc form about a portion of the ratchet pivoted to the bracket.

16. A self-cancelling mechanism for cancelling a turn-signal device of a vehicle for signalling a change of a running direction of the vehicle by rotation of a steering wheel as set forth in claim 15, wherein the portion of the ratchet pivoted to the bracket is arranged between the portion of the bracket mounted to the base plate and the steering column tube.

17. A self-cancelling mechanism for cancelling a turn-signal device of a vehicle for signalling a change of a running direction of the vehicle by rotation of a steering wheel as set forth in claim 13, wherein the elastic member is made of a pole member projected integrally from the ratchet, the forward end thereof being received in a recess formed on a bracket, the pole member is subjected to an elastic deformation by movement of the ratchet towards the rotation position and the ratchet is forced to the neutral position by the force of the pole member reverting from the elastically deformed shape to its original shape.

18. A self-cancelling mechanism for cancelling a turn-signal device of a vehicle for signalling a change of a running direction of the vehicle by rotation of a steering wheel as set forth in claim 17, further comprising a second elastic pole member projected integrally from the bracket, a forward end thereof being inserted into a groove of the ratchet and a stress acting upon the pole members at the time of the rotation of the ratchet being reduced.

19. A self-cancelling mechanism for cancelling a turn-signal device of a vehicle for signalling a change of a running direction of the vehicle by rotation of a steering wheel as set forth in claim 13, wherein the elastic member is a tension coil spring bridging the ratchet and the bracket, the tension coil spring is pulled by the rotation of the ratchet to the rotation position and the ratchet is subjected to a rotation force up to the shortest position of the axis length of the tension coil spring.

20. A self-cancelling mechanism for a turn-signal device mounted on a steering column tube disposed about a steering shaft of a vehicle, comprises:

(a) a base plate fixed to a steering column tube;

(b) a cancelling cam body mounted on the base plate and rotated together with the steering shaft;

(c) a bracket supported to the base plate and pivotable about an axis parallel to the steering shaft;

(d) a detent means selectively positioning the bracket in its original position or in one of a pair of operation positions provided on both sides of the original position;

(e) a ratchet pivotally supported to the bracket and rotated from its neutral position selectively to one of a pair of rotation positions situated on both sides of the neutral position, a pair of nail portions of the ratchet being opposed to the cancelling cam body, so that the bracket is returned back to the original position by the rotation of the steering shaft in a cancelling direction and the bracket is maintained in the operation position to move the ratchet relative to the bracket at the time of the rotation of the steering shaft in an anti-cancelling direction;

(f) a knob holder pivotally supported to the base plate, a part thereof being connected to the bracket;

(g) an operation knob pivotally supported to the knob holder, a supporting axis of the operation knob being arranged substantially at a right angle to a supporting axis of the knob holder to the base plate and the forward end of the operation knob being positioned above the plate for operation of a driver; and (h) a compression coil spring received on halves in the boundary of its axial center in grooves formed on the faces of the ratchet and the bracket opposed to one another, one and the other ends of the compression coil spring in its axial direction being subjected to compression forces from the ratchet and the bracket respectively to thereby return the ratchet back to its neutral position when the ratchet is positioned in one of its rotation positions whereby, in case that the ratchet is suddenly returned from one of the rotation positions back to the neutral position by rotation of the ratchet in an anti-cancelling direction of the steering shaft, the ratchet is restrained from the movement thereof to the other of the rotation positions by inertial force to prevent noises from occurrence.

* * * * *